United States Patent
Sadikay

(10) Patent No.: US 7,536,981 B2
(45) Date of Patent: May 26, 2009

(54) REFORMATE ASSISTED COMBUSTION

(75) Inventor: Fadil Sadikay, Wheelers Hills (AU)

(73) Assignee: Powergen International Pty, Ltd., Keysborough, Victoria (AU)

( * ) Notice: Subject to any disclaimer, the term of this patent is extended or adjusted under 35 U.S.C. 154(b) by 0 days.

(21) Appl. No.: 10/562,312

(22) PCT Filed: Jun. 23, 2004

(86) PCT No.: PCT/AU2004/000822

§ 371 (c)(1),
(2), (4) Date: Apr. 21, 2006

(87) PCT Pub. No.: WO2004/113223

PCT Pub. Date: Dec. 29, 2004

(65) Prior Publication Data
US 2006/0255319 A1 Nov. 16, 2006

(30) Foreign Application Priority Data
Jun. 26, 2003 (AU) .............................. 2003903283

(51) Int. Cl.
F02B 43/00 (2006.01)
F02M 15/00 (2006.01)

(52) U.S. Cl. ............... 123/1 A; 123/3; 123/DIG. 12; 123/541; 123/557

(58) Field of Classification Search ............ 123/3, 123/1 A, 304, 525–527, 540–541, 2, 27 GE, 123/431, 536, 538, 543, 557, 198 A, DIG. 12
See application file for complete search history.

(56) References Cited

U.S. PATENT DOCUMENTS 3,918,412 A * 11/1975 Lindstrom ............... 123/3
4,111,160 A * 9/1978 Talenti ................. 123/1 A
4,282,835 A * 8/1981 Peterson et al. .......... 123/1 A
4,382,189 A * 5/1983 Wilson ................... 290/3
5,119,768 A * 6/1992 Russell ................. 123/1 A
5,156,114 A * 10/1992 Gunnerman ........... 123/1 A
5,229,102 A * 7/1993 Minet et al. ............ 423/652
5,299,536 A * 4/1994 Moard et al. ............ 123/3
5,437,250 A * 8/1995 Rabinovich et al. ........ 123/3
6,058,210 A * 5/2000 de Queiroz et al. ....... 382/232
6,209,494 B1 * 4/2001 Manikowski et al. ...... 123/3
6,397,790 B1 * 6/2002 Collier, Jr. .............. 123/3

(Continued)

FOREIGN PATENT DOCUMENTS

EP 1 267 432 12/2002

(Continued)

Primary Examiner—Hai H Huynh
(74) Attorney, Agent, or Firm—Ryan Kromholz & Manion S.C.

(57) ABSTRACT

A hydrogen gas generator in the form of a reformer is used to produce a reformate gas containing hydrogen and at least one other component for use as a fuel or part of a fuel for a compression engine. The hydrogen containing gas blend or mix is used as one component of a fuel for the engine using hydrogen assisted combustion. The hydrogen containing gas produced as the reformate does not require the non hydrogen components to be removed from the gas prior to introduction to the engine either directly or indirectly. This provides a significant saving in cost as pure hydrogen is no longer required for hydrogen assisted combustion.

36 Claims, 1 Drawing Sheet

U.S. PATENT DOCUMENTS

| | | | |
|---|---|---|---|
| 6,508,209 B1* | 1/2003 | Collier, Jr. | 123/3 |
| 6,571,747 B1* | 6/2003 | Gerstweiler | 123/3 |
| 6,572,837 B1* | 6/2003 | Holland et al. | 423/648.1 |
| 6,756,140 B1* | 6/2004 | McAlister | 429/20 |
| 6,994,930 B1* | 2/2006 | Geisbrecht et al. | 429/19 |
| 7,059,277 B2* | 6/2006 | Matsuoka | 123/3 |
| 7,273,044 B2* | 9/2007 | Flessner et al. | 123/536 |
| 7,384,620 B2* | 6/2008 | Bowman et al. | 423/648.1 |
| 2004/0020188 A1* | 2/2004 | Kramer et al. | 60/275 |
| 2005/0115226 A1* | 6/2005 | Benz et al. | 60/287 |
| 2005/0224042 A1* | 10/2005 | Shinagawa et al. | 123/295 |
| 2005/0226809 A1* | 10/2005 | Gudlavalleti et al. | 423/651 |
| 2006/0070587 A1* | 4/2006 | Bhalsora et al. | 123/3 |

FOREIGN PATENT DOCUMENTS

| | | |
|---|---|---|
| EP | 1 354 852 | 10/2003 |
| WO | WO 92/07922 | 5/1992 |

\* cited by examiner

REFORMATE ASSISTED COMBUSTION

The present invention relates to the production of hydrogen gas and the use of this gas as one component of a fuel in hydrogen assisted combustion. In particular the present invention relates to a method and apparatus for producing hydrogen or a hydrogen-containing gas together with other components, typically gaseous components, for use as a fuel, fuel component or in combination with a fuel for hydrogen assisted combustion in an engine. More particularly, the present invention relates to a method and apparatus of more efficiently producing a hydrogen-containing gas for use as a fuel or fuel additive, or in combination with a fuel for an engine, such as for example, as part of the air supply, or the fuel supply for an engine, particularly a combustion engine, such as a compression engine, including a diesel engine or similar. Even more particularly, the present invention relates to the use of a hydrogen generator, such as for example, a reformer for producing a reformate gas from heated steam or from heating fuels and air or other gases with steam, in which the reformate gas contains materials other than hydrogen, such as for example, oxygen, nitrogen, water vapour, carbon monoxide, carbon dioxide, carbon-containing materials or gases or the like, for use in combination with air as an additive to fuel for use in a compression engine, particularly an engine using hydrogen-assisted combustion, such as a diesel engine.

The present invention finds particular application as a method and apparatus for producing a hydrogen-containing gaseous blend and a method of using the gaseous blend as a fuel component which is added to the air stream being introduced into a diesel engine for hydrogen-assisted combustion or reformate assisted combustion to promote more efficient combustion within the engine thereby providing either an increase of power with the same amount of fuel or the same power with a reduced amount of fuel. The method and apparatus of the present invention allows hydrogen-containing gas to be. produced more efficiently at lower cost, and when used as a fuel allows the problems associated with hydrogen-assisted combustion, such as for example, damaging pre-ignition or excessive cylinder pressures to be avoided, by being able to use a gas which contains other materials in addition to the hydrogen, thereby obviating the previously used expensive purification processes that were required to remove almost all of non-hydrogen gas components from the material being produced by the hydrogen generator, before it could be used in applications such as for example exhaust catalytic treatments, fuel cells or similar. Thus, the present invention enables less than pure hydrogen to be used in hydrogen assisted combustion.

Although the present invention will be described with reference to one form of a hydrogen reformer producing a reformate gas containing hydrogen together with other gaseous components and the use of this gas as a fuel component in diesel engines, it is to be noted that the present invention is not restricted in scope to the described embodiment, but rather, the scope of the present invention is more extensive so as to include other means of producing hydrogen, the production of gases containing hydrogen other than the reformate gas, the use of various gaseous mixtures or blends in applications other than engines, and different embodiments of combining the fuel components together and introducing the various gaseous combinations into engines.

It is known to use hydrogen as a fuel additive in some types of engines, most notably internal combustion engines or similar engines, such as diesels, as part of the fuel system and/or air supply system. The use of hydrogen is termed hydrogen-assisted combustion. However, it appears as though only minimal investigations have been conducted regarding the various aspects of hydrogen-assisted combustion in compression ignition engines, such as for example, in diesel engines and the like. One reason for this is that there are a number of serious problems associated with hydrogen-assisted combustion generally, and with respect to diesel engines in particular. It was thought that if hydrogen gas could be added to the fuel system and/or air supply system of diesel engines, the presence of the hydrogen as part of the overall fuel composition would increase the power and efficiency of such engines by increasing the efficiency of combustion of the fuel in such engines, such as for example, by having increased burning efficiency to produce greater power or the like either for the same amount of fuel or by using additional fuel. However, introducing hydrogen as a significant component into the fuel composition has in the past resulted in damaging pre-ignition and the development or build up of excessive cylinder pressure within the engine.

Up until now, no one had thought of using a hydrogen gas blend or mixture and particularly no one had thought of using high volume reformers to produce hydrogen for introduction into the engine without purification because reformers of this type were developed in fuel cell technology and were not connected to inlets or other fuel, air or the like inlets of diesel engines in order to reduce fuel consumption of the engines. Their primary use was to use the impure form of the gases to preheat engines and treat exhausts, but not to be used with air, as a fuel or a fuel component and certainly not for use in hydrogen-assisted combustion of an engine.

Surprisingly, it has now been discovered that at least some compression engines are able to use a gas which is less pure in hydrogen content than previously thought possible which use results in increased combustion efficiency and/or increased power being developed by the engine. Also, in some cases, it has been discovered surprisingly that the exhaust emissions have improved as well. Therefore, rather than having to remove the contaminating or impure components from the hydrogen produced by the hydrogen generator at high cost as was previously required, the present inventors have discovered that it is possible to be able to use other than pure hydrogen in the engines, that is, it is possible to use hydrogen combined with other components from the hydrogen generator as an additive to the fuel supply of diesel engines without there being any observable reduction in efficiency of operation or power generation of the engine.

Another problem of existing hydrogen-assisted combustion techniques is that various other components were required to be added to the hydrogen in order to overcome the problems of hydrogen-assisted combustion within an engine and also these other components needed to be added separately to the engine in order to control precisely the amounts of each individual component added to the fuel system. Thus, a separate feed or supply line to the engine was needed for each of the various components, such as for example, separate supply lines or feed lines for substantially pure hydrogen, water, air and fuel were required. Metering and controlling the introduction of predetermined amounts of each of these components required sophisticated monitoring equipment, sensors, injecting equipment and the like to ensure that the correct amounts and ratios of all of the components were introduced into the engine at all times, and that the various components were adequately mixed together in the correct proportions before their actual combustion within the engine. Thus, there was a degree of complexity associated with existing hydrogen-assisted combustion techniques and equipment owing to the separate introduction of the various components. Accordingly, there is a need to reduce the complexity of introducing separate materials in separate feed lines to the engine, and combining the materials in the correct ratios and in the correct manner prior to actual combustion. The present invention sets out to provide a method and apparatus for having a single feed of a hydrogen gas, or hydrogen-containing gas, blend or mixture requiring a single feed line or input only.

Therefore, it is an aim of the present invention to provide a method and apparatus for generating a hydrogen-containing gas in combination with other materials and a method and apparatus for using the hydrogen-containing gas as a fuel component in compression engines without the need to remove other unwanted components from the hydrogen gas prior to its use as the fuel. Further, it is another aim of the present invention to provide a method and apparatus that provides the correct amount and ratio of components in the gaseous blend or mixture by adjusting the operating conditions of the hydrogen gas mixture or blend generator.

According to one aspect of the present invention, there is provided a method of using a hydrogen-containing gas as a fuel, a component of a fuel, a fuel additive or an additive to air for mixing with a fuel in a compression engine, in which the hydrogen-containing gas also contains other products from the hydrogen generation process used to generate the hydrogen gas, including the steps of producing the hydrogen-containing gas, blend or mix, introducing the gas, blend or mix to a compression engine as one component of the fuel, and combusting the fuel to produce power in the engine, wherein the relative amounts of the components of the gas blend or mixture including the amount of hydrogen and non-hydrogen components are selected in accordance with the requirements of hydrogen-assisted combustion of the engine.

According to another aspect of the present invention, there is provided an apparatus for producing a hydrogen-containing gas blend or mix, comprising a hydrogen gas generator and a mixer, including the steps of producing hydrogen in combination with other materials using the hydrogen gas generator, wherein the hydrogen-containing gas, blend or mix includes hydrogen and the other materials in which the relative amounts of the hydrogen and other materials are in predetermined amounts with respect to each other in accordance with the requirements of hydrogen-assisted combustion of the engine to which the gas, blend or mix is introduced and mixing the components in the mixer prior to combustion.

According to another aspect of the present invention, there is provided a method of operating a hydrogen generating apparatus to produce a hydrogen-containing gas blend or mixture comprising hydrogen and at least one other component suitable for use as a fuel, a fuel component, an additive for fuel or similar, including the steps of adjusting operating parameters of the hydrogen generating apparatus to provide a preselected composition of the gas blend or mixture in which the respective amounts of the hydrogen and other component or components are in accordance with requirements of an engine to which the gas blend or mixture is provided or supplied in order to facilitate hydrogen-assisted combustion of the engine, thereby increasing the efficiency and/or performance of the engine.

According to another aspect of the present invention, there is provided a fuel for hydrogen-assisted combustion in an engine comprising hydrogen in combination with one or more other materials in which the relative amounts of the hydrogen to the other material or materials is selected in accordance with the requirements of the engine wherein the hydrogen is produced by a hydrogen generator along with other components.

According to another aspect of the present invention, there is provided a hydrogen-containing gas blend or mix containing one or more components in addition to hydrogen in which the relative amounts of the hydrogen to the other component or components is in accordance with the requirements for hydrogen-assisted combustion within an engine to which the gas blend or mix is introduced.

Typically, the hydrogen generator useful in the present invention generates hydrogen in combination with other materials. Typically, the hydrogen generator is an electrolysis apparatus, a fuel cell, a fuel processor, a reformer, a cold fusion apparatus or the like, and includes any apparatus for making hydrogen.

Typically the fuel cell is a proton exchange fuel cell (PEMFC), solid oxide fuel cell (SOFC), an alkaline fuel cell (AFC), direct methanol fuel cell (DMFC), a molten carbonated fuel cell (MCFC), phosphoric acid fuel cell (PAFC), or a regenerative fuel cell (RFC), or the like. More typically, the hydrogen generator is a reformer in which steam is used to heat a fuel as it passes over a catalyst. Typically, the fuel and steam are chemically cracked. The reformers generally reform a hydrocarbon fuel to hydrogen gas with the aid of steam. Typically, the hydrogen produced in the hydrogen generator, typically the fuel cell, is produced in combination with oxygen, nitrogen, water, ethanol, carbon dioxide, carbon monoxide, hydrocarbons, methanol, methane or the like.

Typically, the hydrocarbon material produced in the hydrogen generator includes a paraffin or paraffin-like hydrocarbon containing saturated bonds. More typically, the hydrocarbon is selected from C1-C20, preferably from C2-C12, more preferably C4-C10, and most preferably C8 hydrocarbons, including mixtures and combinations of at least one or more such materials.

Typically, the methanol, methane or similar materials are a byproduct from the fuel used in the hydrogen generator, such as the reformer to produce the hydrogen, such as for example, being derived from the original reformer-based fuel, such as diesel, petrol, canola oil or the like.

Typically, the gaseous blend or mixture produced by the hydrogen generator contains from 0-50% by volume of hydrogen, 30-40% by volume, and preferably 35-38% by volume hydrogen. Typically, there is from 0-25% by volume of carbon monoxide, preferably 3-5% by volume, and preferably 4-5% by volume carbon monoxide. Even more typically, the amount of hydrocarbon material is from 0-5% by volume, typically 1-4% by volume, and preferably 2-3% by volume. Typically, the amount of carbon dioxide produced is from 0-25% by volume, preferably 5-15% by volume, and more preferably 3-10% by volume. It is to be noted that the balance of any gaseous blend or mixture produced by the hydrogen generator is nitrogen, methanol, or other gases as required or desired depending upon circumstances. The gas blend is chosen for a range of purposes, such as for example the need to eliminate, prevent, reduce, minimise or the like pre-ignition within the engine.

Another aspect of the present invention is the ability to preselect, predetermine or the like the ratio of individual components in the gaseous blend or mixture being produced by the hydrogen generator. Depending upon the requirements of the engine, the hydrogen generator can be operated at selectively adjustable parameters in order to provide the optimal amounts of each of the components and the ratio of the various components of the gaseous blend or mixture to achieve maximum efficiencies of the operation of the engine, depending upon a number of factors of the engine such as for example, whether in the interest of economy, the same amount of power with reduced fuel consumption or in the interest of power, producing more power for the same fuel consumption.

Typical parameters of the materials being fed to the engine are the gas flows or gas velocities of the various components and the overall composition of the mixture of components, the temperature at which the hydrogen generator is operated, the pressure at which the hydrogen generator is operated, the velocity of gas being passed through, produced by or formed in the generator, the catalyst being used in the generator, the amount of exposure of the reactants to the catalyst, the type of hydrogen generator being used or the like.

It is to be noted that the operating conditions of the hydrogen generator are adjustable so that the production of certain components can be minimised or prevented by operating the system within set parameters or amounts. However, it is to be noted also that the production of other components can be optimised.

Typical operating conditions of the reformer which catalytically decomposes or cracks heated steam to produce hydrogen and oxygen include the following. The reformer can be operated at a temperature of from 100° C.-1,000° C., typically from 200° C.-900° C., preferably from 220° C.-800° C.

Typically, the pressure of operation of the reformer is from 1-5 bar, typically from 1-3 bar and preferably at about 2 bar.

Typically, the reformer can produce any volume or amount of gas depending upon the size of the gas generator and the application in which the hydrogen assisted composition is used. Typical catalysts include platinum, nickel or any other suitable catalyst for catalysing the reforming of hydrogen from heated steam.

The present invention will now be described by way of example with reference to the accompanying drawings, in which.

Figure 1:
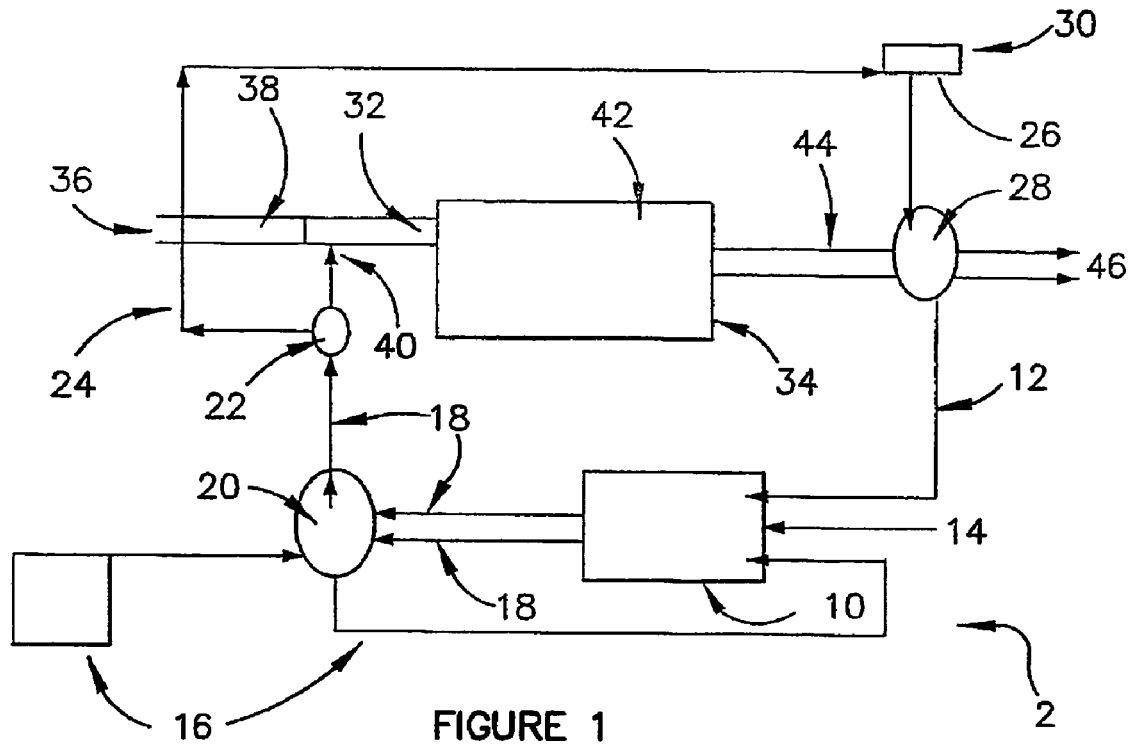
FIG. 1 is a schematic view of one form of the gas blend production and supply system and fuel introduction system of the present invention.

In FIG. 1 is shown schematically one form of a gas supply and use system in accordance with the present invention, generally denoted as 2. This form includes a hydrogen generator, for producing a hydrogen-containing gas, gas blend or gas mixture containing hydrogen. One example of the hydrogen generator is a reformer 10 for producing a reformate gas which contains hydrogen as one component. It is to be noted that reformer 10 can take any suitable form. In one embodiment, the reformer 10, which is sometimes known as a fuel processor, takes the form of an open grid of metal through which a stream of heated steam 12 is passed. The metal from which the grid can be made is a suitable catalyst, such as platinum or nickel or the metal may be coated with a coating of a suitable catalysing material, such as a nickel or platinum-containing compound, or a compound containing both nickel and platinum, or any other suitable catalytic material for catalysing the production of hydrogen from steam or the like. Heat is applied to the incoming heated steam 12 optionally in combination with other gases, fuel or the like, in the proximity of the catalytic metal surface of the reformer 10 so as to catalytically decompose the steam to form a hydrogen-containing gas and other components or materials, either as required or naturally. In one embodiment, a supply of air 14 is introduced into reformer 10 as is a supply of reformer fuel 16. Typically, the reformer may include a plasma device or plasma arc or similar for decomposing or cracking the steam and/or other gases and/or fuel into hydrogen and the other components.

Along with hydrogen being produced in the hydrogen generator, other gaseous components can also be produced.

Typical examples of other materials produced in the gaseous mixture or blend include nitrogen, carbon dioxide, carbon monoxide, methane, ethanol, hydrocarbons or the like.

The gaseous mix or blend 18 is discharged from the reformer 10 at a temperature of about 600° C., whereupon it is passed through a first or main heat exchanger 20, where heat is extracted so as to reduce the temperature of the gas mixture or blend to about 200° C. Optionally, the gas blend is passed to a second or auxiliary heat exchanger 22 where further heat is extracted from the hydrogen gas, blend or mixture so as to reduce the temperature of the gas blend even further to below about 100° C., preferably to below about 100° C., more preferably to below about 50° C. A condensate stream 24 formed from the cooling of the gas blend is returned from heat exchanger 22 to a water supply vessel 26, reservoir or similar, water or condensate from water supply vessel 26 is passed through a third heat exchanger 28 to heat a mixture of the water condensate and fresh water 30 from vessel 26 to form steam for supply to the reformer 10 as the steam supply 12 so as to assist in the efficiency of operation of the hydrogen generator 10.

The gas blend or mix 18 now at 200° C. is passed to a first inlet 32 of engine 34. Air 36 is admitted to the engine 34 through inlet 32 as well. In one embodiment, the reformate gas 18 is introduced to the air supply line 38 through inlet 40 where it is mixed with the incoming air 36 before being introduced into engine 34 through inlet 32. Fuel, in the form of diesel or similar, is admitted to the engine 34 through a further injection inlet 42. The gaseous blend containing hydrogen and the air mixture introduced through inlet 32 and the fuel is mixed within the engine prior to combustion, to operate the engine. After combustion, the combusted products are discharged from engine 34 through exhaust stream 44 as hot exhaust gases.

In one embodiment, the heated exhaust gases in exhaust stream 44 are passed to heat exchanger 28 where heat is transferred to the incoming water supply 30 to form steam for supply as the steam 12 to reformer 10. The cooled exhaust gases are then vented to atmosphere as cooled exhaust gas stream 46.

Figure 2:
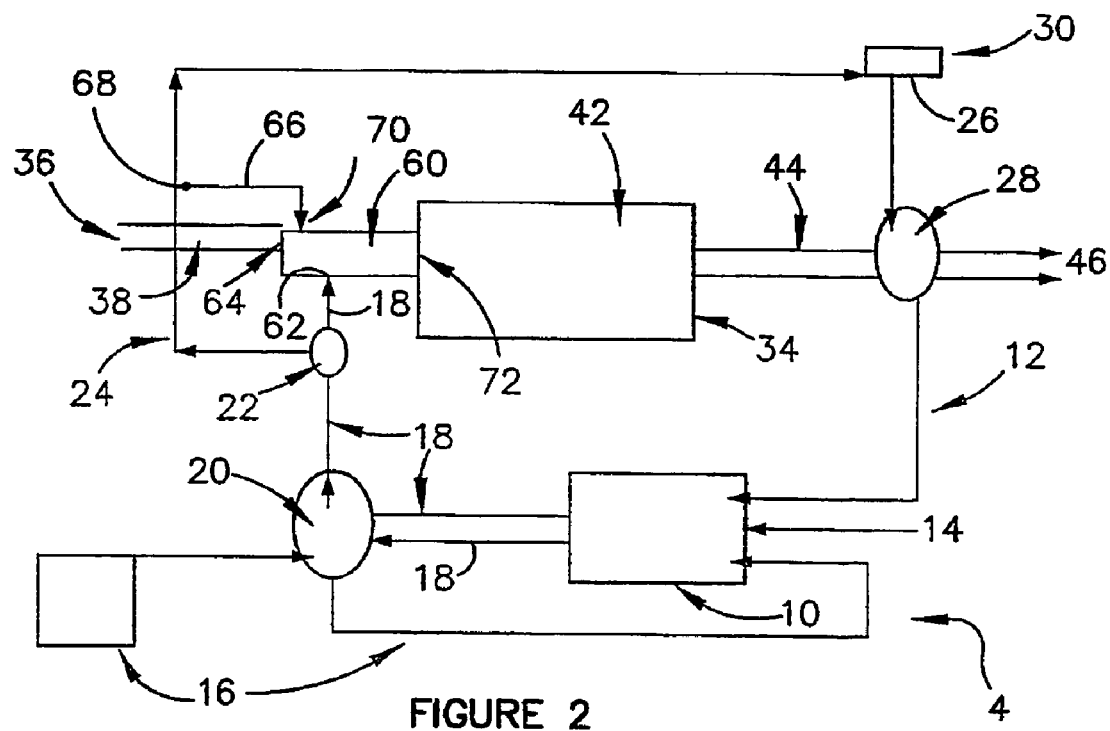
FIG. 2 is a schematic view of another form of the gas blend production supply and use system of the present invention.

A further embodiment of the present invention is shown schematically in FIG. 2. This embodiment has a mixing chamber or similar which is absent in the embodiment of FIG. 1.

In the embodiment shown in FIG. 2, the same reference numerals will be used to identify the same or similar corresponding features of FIG. 1. The form of gas supply and use system of FIG. 2 is generally denoted as 4.

This system is the same as that described with respect to FIG. 1 apart from having an additional mixing chamber or mixer 60 connected to the air intake supply line 38 of engine 34. In this embodiment, the reformate stream containing hydrogen and other components is conveyed from heat exchanger 22 to a first inlet 62 of mixing chamber or mixer 60 to introduce the gas blend into mixer 60. Air supply 36 is passed through air supply line 38 for introduction through inlet 64 into mixer 60. A further supply line 66 is provided for supplying a mixture of methanol and water 68 to mixer 60 through inlet 70. All of the components of the gas blend 18, air 36, water and methanol 68 and any other materials added to mixer 60 are mixed in mixer 60 before being introduced into engine 34 through inlet 72 for mixing with fuel 42 prior to combustion to operate engine 34. It is to be noted that the gas mixture and air, together with other components of the fuel mixture, are mixed in predetermined amounts to obtain the required ratios in accordance with the requirements of the engine. Further, it is to be noted that in this embodiment, air is introduced at a constant velocity.

In a still further embodiment of the apparatus and method of the present invention, the hydrogen generator 10 is provided with suitable control means for adjusting the operating conditions so as to produce preselected or predetermined amounts of each of the components of the hydrogen gas, blend or mixture. The hydrogen generator can be adjusted to produce the ratios of each of the individual components as desired.

The advantage of the present invention is that pure or substantially pure hydrogen is not required for efficient hydrogen-assisted combustion. This leads to a great saving in time, effort and expense in not having to remove contaminating material from the hydrogen gas prior to introduction into the engine or for hydrogen assisted combustion within the engine. It is estimated that savings of up to 50 times the current cost of producing hydrogen can be achieved by using the hydrogen in combination with other materials, particularly the other materials produced during the hydrogen gas generation, ie., byproducts of the reaction in the reformer. Such normally produced gas blend or mix can be supplied to the engine in combination with the hydrogen in a single feed line or through a single inlet without having to treat the normally produced stream to remove unwanted materials.

In some embodiments of the present invention, the hydrogen gas can be fed directly into the compression engine without having to undergo prior mixing. In other embodiments, the gas can be fed indirectly into the engine by passing through an intermediate component, such as for example, a mixer to improve the efficiency of combustion.

Another advantage of the present invention is that the hydrogen generator can be operated under a wide variety of different conditions to produce a wide variety of different amounts and combinations of components in the gas blend or mixture in accordance with the requirements of the particular end use, such as for example, in accordance with the size, type and speed of the compression engine and the requirements of the engine, whether economical operation or the development of increased power.

Other advantages of the present invention include that there are fuel savings to be had, that increased power is available and the exhaust emissions are reduced.

The described arrangement has been advanced by explanation and many modifications may be made without departing from the spirit and scope of the invention which includes every novel feature and novel combination of features herein disclosed.

Those skilled in the art will appreciate that the invention described herein is susceptible to variations and modifications other than those specifically described. It is understood that the invention includes all such variations and modifications which fall within the spirit and scope.

I claim:

1. A method comprising
providing a hydrogen generator,
providing a compression engine
assessing requirements for hydrogen assisted combustion within the compression engine,
causing a reaction of materials in the hydrogen generator in the presence of heat to produce a hydrogen containing gas blend or gas mixture comprising by volume 50% or less hydrogen gas and at least one other gaseous by-product of the reaction, including selecting for the gas blend or gas mixture relative amounts of the hydrogen gas and the at least one other gaseous by-product in accordance with the nature of the at least one other gaseous by-product and the requirements for hydrogen assisted combustion within the compression engine,
reducing the temperature of the gas blend or gas mixture by passing the gas blend or gas mixture through a heat exchanger to form a cooled gas blend or gas mixture,
introducing the cooled gas blend or gas mixture into a compression engine as a first fuel component,
introducing a second fuel component into the compression engine comprising a hydrocarbon or hydrocarbon containing fuel for the compression engine,
combusting the first and second fuel components within the compression engine to form exhaust gases, and
passing the exhaust gases through another heat exchanger to extract heat from the exhaust gases, and
transferring the heat to aid the reaction in the hydrogen generator producing the hydrogen containing gas blend or mixture.

2. A method of operating a compression engine using hydrogen assisted combustion comprising
selecting the compression engine
assessing requirements for hydrogen assisted combustion within the selected compression engine,
providing a hydrogen generator,
producing from a reaction of materials in the hydrogen generator in the presence of heat a hydrogen containing gas blend or gas mixture comprising by volume 50% or less hydrogen gas and at least one other gaseous by-product of the reaction, including selecting for the gas blend or gas mixture relative amounts of the hydrogen gas and the at least one other gaseous by-product in accordance with the nature of the at least one other gaseous by-product and the requirements for hydrogen assisted combustion in the selected compression engine,
cooling the gas blend or gas mixture by passing the gas blend or gas mixture through a heat exchanger to form a cooled gas blend or gas mixture,
introducing the cooled gas blend or gas mixture into the compression engine as a first fuel component for the combustion engine,
introducing a second fuel component into the compression engine comprising a hydrocarbon or hydrocarbon containing fuel for the compression engine,
combusting the first and second fuel components in the combustion engine to form exhaust gas,
passing the exhaust gas through a heat exchanger to extract heat from the exhaust gas, and
transferring the heat to aid the reaction in the hydrogen generator producing the gas blend or gas mixture.

3. A method according to claim 2 the materials reacted in the hydrogen generator comprises a fuel material including diesel, petrol, gasoline or canola oil.

4. A method according to claim 1 or 2 wherein the reaction within the hydrogen generator reaction produces a hydrocarbon material with the hydrogen containing gas blend or gas mixture and the at least one other gaseous by-product.

5. A method according to claim 4 wherein the hydrocarbon material includes a paraffin or paraffin-like hydrocarbon containing saturated bonds.

6. A method according to claim 5 wherein the hydrocarbon comprises a $C_1$-$C_{20}$ hydrocarbon or a combination thereof.

7. A method according to claim 1 or 2 and further including adjusting reaction parameters of the hydrogen generator to produce a desired ratio of hydrogen gas to the at least one other by-product.

8. A method according to claim 7 wherein the reaction parameters include at least one of (i) composition of the materials reacted in the hydrogen generator, (ii) velocities of gases during the reaction, (iii) temperature of the reaction in the hydrogen generator, (iv) the pressure of the reaction in the hydrogen generator, (v) a reaction catalyst, (vi) magnitude of exposure of the materials to the reaction catalyst, (vii) type of hydrogen generator, (viii) nature and composition of the at least one other by-product, (ix) magnitude of cooling of the gas blend or gas mixture introduction into the compression engine, and (xi) temperature of the materials in the reaction.

9. A method according to claim 8 wherein the pressure is from about 1-5 bar.

10. A method according to claim 8 wherein the reaction catalyst is selected from the group consisting of: nickel, platinum, materials containing nickel or platinum or combinations thereof.

11. A method according to claim 1 or 2 wherein the cooled gas blend or gas mixture is added directly to the compression engine or indirectly to the compression engine after cooling.

12. A method according to claim 11 wherein the cooled gas blend or gas mixture is added to a mixing chamber prior to being introduced into the compression engine.

13. A method according to claim 1 or 2 wherein the gas blend or gas mixture is introduced as the first fuel component in combination with the second fuel component for the compression engine.

14. A method according to claim 1 or 2 wherein the second fuel component for the compression engine is introduced to the compression engine separately from the first fuel component.

15. A method according to claim 1 wherein the gas blend or gas mixture comprises by volume about 30% to about 40% of hydrogen gas.

16. A method according to claim 1 wherein the gas blend or gas mixture comprises by volume about 35% to about 38% of hydrogen gas.

17. A method according to claim 1 or 2 wherein the at least one other gaseous by-product is selected from the group consisting of: oxygen, nitrogen, water, ethanol, carbon dioxide, carbon monoxide, hydrocarbons, methanol, methane or combinations thereof.

18. A method according to claim 2 wherein the gas blend or gas mixture comprises by volume about 30% to about 40% of hydrogen gas.

19. A method according to claim 2 wherein the gas blend or gas mixture comprises by volume about 35% to about 38% of hydrogen gas.

20. A fuel system for a compression engine comprising a hydrogen generator for generating a hydrogen containing gas including by volume 50% or less hydrogen and at least one other by-product component together comprising a gas blend or mixture at a first temperature, the gas blend or mixture comprising one fuel component for the compression engine, the relative amounts of the hydrogen gas and of the at least one other by-product component the gas blend or mixture being selected in accordance with the nature of the at least one other by-product component and the requirements of hydrogen assisted combustion within the compression engine, and a heat exchanger for reducing the first temperature of the hydrogen gas blend or mixture to a second temperature prior to introducing the gas blend or mixture to the compression engine.

21. A system according to claim 20 wherein the hydrogen generator is selected from the group consisting of: an electrolysis apparatus, a fuel cell, a fuel processor, a reformer, a cold fusion apparatus or other apparatus for producing hydrogen gas along with one or more other by-product components.

22. A system according to claim 21 wherein the hydrogen generator comprises a reformer operated at a temperature of from 100° C.-1000° C.

23. A system according to claim 21 wherein the fuel cell is selected from the group consisting of: a proton exchange fuel cell, a solid oxide fuel cell, an alkaline fuel cell, a direct methanol fuel cell, a molten carbonate fuel cell, a phosphoric acid fuel cell or a regenerative fuel cell.

24. The A system according to claim 21 wherein the hydrogen generator comprises a reformer in which steam is used to heat a fuel as it passes over a catalyst provided in the hydrogen generator to produce the hydrogen gas together with the at least one other material by-product component to form the gas blend or mixture in the form of a reformate gas.

25. A system according to claim 24 wherein the fuel and steam are cracked by passage through the hydrogen generator to form the reformate gas or hydrogen containing gas blend or mixture.

26. The A system according to claim 24 wherein the reformer reforms a hydrocarbon fuel including petrol, diesel or gasoline to the reformate gas or hydrogen containing gas blend or mixture with the aid of steam.

27. A system according to claim 20 wherein the compression engine comprises a diesel engine.

28. A fuel system according to claim 20 wherein the gas blend or mixture comprises by volume about 30% to about 40% of hydrogen gas.

29. A fuel system according to claim 20 wherein the gas blend or mixture comprises by volume about 35% to about 38% of hydrogen gas.

30. A hydrogen containing gas blend or mix suitable for use as a fuel or fuel additive or one component of a fuel characterised in that the gas blend or mix comprises by volume 50% or less hydrogen gas and at least one other component that is produced substantially simultaneously with the hydrogen gas by a hydrogen generator in which the relative amounts of the hydrogen gas and the other component are selected in accordance with the nature of the other component and the requirements of a selected compression engine for hydrogen assisted combustion within the selected compression engine to which the gas blend or mix is introduced, the gas blend or mix being subject to cooling prior to combustion within the selected compression engine.

31. A gas blend according to claim 30 wherein the gas blend or mix includes from about 0-25% by volume of carbon monoxide.

32. A gas blend according to claim 30 wherein the gas blend or mix includes up to about 5% by volume hydrocarbon material.

33. The A gas blend according to claim 30 wherein the amount of carbon dioxide contained in the gas blend or mix is up to about 25% by volume.

34. The A gas blend according to claim 30 wherein the gas blend or mix contains the balance of nitrogen.

35. A gas blend according to claim 30 wherein the gas blend comprises by volume about 30% to about 40% of hydrogen gas.

36. A gas blend according to claim 30 wherein the gas blend comprises by volume about 35% to about 38% of hydrogen gas.

* * * * *

UNITED STATES PATENT AND TRADEMARK OFFICE
CERTIFICATE OF CORRECTION

PATENT NO. : 7,536,981 B2  
APPLICATION NO. : 10/562312  
DATED : May 26, 2009  
INVENTOR(S) : Fadil Sadikay Page 1 of 1

It is certified that error appears in the above-identified patent and that said Letters Patent is hereby corrected as shown below:

Column 9, line 11 of claim 8, delete "(vii) type of hydrogen generator" and substitute
-- (vii) type of the hydrogen generator --

Column 10, line one of claim 24, delete "The"

Column 10, line one of claim 33, delete "The"

Column 10, line one of claim 34, delete "The"

Signed and Sealed this
Nineteenth Day of February, 2013

Teresa Stanek Rea
*Acting Director of the United States Patent and Trademark Office*